United States Patent
Mori et al.

(10) Patent No.: US 12,467,673 B2
(45) Date of Patent: Nov. 11, 2025

(54) REFRIGERATION CYCLE APPARATUS AND REFRIGERATION CYCLE METHOD

(71) Applicant: Mitsubishi Electric Corporation, Tokyo (JP)

(72) Inventors: Yuki Mori, Tokyo (JP); Takahiro Nakai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 130 days.

(21) Appl. No.: 18/283,220

(22) PCT Filed: Mar. 31, 2021

(86) PCT No.: PCT/JP2021/013815
§ 371 (c)(1),
(2) Date: Sep. 21, 2023

(87) PCT Pub. No.: WO2022/208717
PCT Pub. Date: Oct. 6, 2022

(65) Prior Publication Data
US 2024/0167745 A1    May 23, 2024

(51) Int. Cl.
*F25B 49/02*    (2006.01)
*F25B 41/31*    (2021.01)

(52) U.S. Cl.
CPC .............. *F25B 49/02* (2013.01); *F25B 41/31* (2021.01); *F25B 2600/2513* (2013.01); *F25B 2700/04* (2013.01); *F25B 2700/21* (2013.01)

(58) Field of Classification Search
CPC .. F25B 49/02; F25B 41/31; F25B 2600/2513; F25B 2700/04; F25B 2700/21
See application file for complete search history.

(56) References Cited

U.S. PATENT DOCUMENTS

| | | | |
|---|---|---|---|
| 9,086,232 B1* | 7/2015 | Read | F25B 41/20 |
| 2015/0153086 A1* | 6/2015 | Takayama | F25B 7/00 62/228.3 |
| 2016/0178266 A1* | 6/2016 | Malwitz | F04D 19/005 310/71 |

FOREIGN PATENT DOCUMENTS

| | | |
|---|---|---|
| EP | 3199889 A1 | 8/2017 |
| JP | H11-270918 A | 10/1999 |

(Continued)

OTHER PUBLICATIONS

International Search Report and Written Opinion mailed on May 25, 2021, received for PCT Application PCT/JP2021/013815, filed on Mar. 31, 2021, 9 pages including English Translation.

(Continued)

*Primary Examiner* — Henry T Crenshaw
(74) *Attorney, Agent, or Firm* — XSENSUS, LLP

(57) ABSTRACT

The present disclosure provides a refrigeration cycle apparatus, including a compressor to compress a sucked refrigerant, a condenser to condense the refrigerant discharged from the compressor to exchange heat, a receiver to store the refrigerant discharged from the condenser, an evaporator to evaporate the refrigerant discharged from the receiver to exchange heat, an upstream expansion valve provided at a pipe between the condenser and the receiver, a downstream expansion valve provided at a pipe between the receiver and the evaporator, and a controller to control an opening degree of the upstream expansion valve and an opening degree of the downstream expansion valve in conjunction with each other so as to keep an opening degree ratio between the opening ratio of the upstream expansion valve and the opening ratio of the downstream expansion valve constant.

9 Claims, 5 Drawing Sheets

(56) References Cited

FOREIGN PATENT DOCUMENTS

| JP | 2011-038742 | * | 2/2011 |
|----|-------------|---|--------|
| JP | 2011-038742 A | | 2/2011 |
| JP | 2012-017878 A | | 1/2012 |
| JP | 2014-240714 A | | 12/2014 |
| JP | 2017-133763 A | | 8/2017 |
| JP | 2019-148396 A | | 9/2019 |

OTHER PUBLICATIONS

Notice of Reasons for Refusal mailed on Oct. 12, 2021, received for JP Application 2021-548594, 6 pages including English Translation.

* cited by examiner

REFRIGERATION CYCLE APPARATUS AND REFRIGERATION CYCLE METHOD

CROSS-REFERENCE TO RELATED APPLICATION

This application is based on PCT filing PCT/JP2021/013815, filed Mar. 31, 2021, the entire contents of which are incorporated herein by reference.

TECHNICAL FIELD

The present disclosure relates to a control technique for expansion valves in refrigeration cycles.

BACKGROUND ART

A refrigeration cycle apparatus has a refrigerant circuit that includes a compressor, a condenser, an upstream expansion valve, a receiver that stores a liquid refrigerant, and a downstream expansion valve. The refrigeration cycle apparatus is configured to control the supercooling degree in the upstream expansion valve and the suction superheat degree in the downstream expansion valve. Examples of the refrigeration cycle apparatuses of this type includes a refrigeration cycle apparatus that has a liquid storage determination unit that determines whether or not a liquid refrigerant is stored in the receiver (see, for example, Patent Reference 1). When no liquid refrigerant is determined to be stored in the receiver, the refrigeration cycle apparatus of Patent Reference 1 increases the opening degree of the upstream expansion valve until the suction superheat degree of the compressor reaches a predetermined target value.

PRIOR ART REFERENCE

Patent Reference

Patent Reference 1: Japanese Patent Application Publication No. 2019-148396

SUMMARY OF THE INVENTION

Problem to be Solved by the Invention

However, in the conventional refrigeration cycle apparatus, a change in the amount of liquid refrigerant in the condenser or the receiver is not taken into account. For example, in the air conditioner disclosed in Patent Reference 1, even if the opening degree of the upstream expansion valve is increased, the depletion of the liquid refrigerant in the receiver during the change of the opening degree of the downstream expansion valve cannot be avoided in advance. This causes a problem of temporary degradation in the air conditioner performance.

The present disclosure is made to solve the above problem, and an object of the present disclosure is to suppress unnecessary variations in the amount of liquid refrigerant in a condenser or a receiver to avoid the degradation in the performance.

Means of Solving the Problem

A refrigeration cycle apparatus according to the present disclosure is characterized by including a compressor to compress a sucked refrigerant, a condenser to condense the refrigerant discharged from the compressor to exchange heat, a receiver to store the refrigerant discharged from the condenser, an evaporator to evaporate the refrigerant discharged from the receiver to exchange heat, an upstream expansion valve provided at a pipe between the condenser and the receiver, a downstream expansion valve provided at a pipe between the receiver and the evaporator, and a controller to control an opening degree of the upstream expansion valve and an opening degree of the downstream expansion valve in conjunction with each other so as to keep an opening degree ratio between the upstream expansion valve and the downstream expansion valve constant.

A refrigeration cycle method according to the present disclosure is characterized by including the steps of compressing a sucked refrigerant in a compressor, condensing the refrigerant discharged from the compressor in a condenser to exchange heat with air, storing the refrigerant discharged from the condenser in a receiver, evaporating the refrigerant discharged from the receiver in an evaporator to exchange heat with air, and controlling an opening degree of an upstream expansion valve and an opening degree of a downstream expansion valve in conjunction with each other so as to keep an opening degree ratio between the upstream expansion valve and the downstream expansion valve constant, the upstream expansion valve being provided at a pipe between the condenser and the receiver, the downstream expansion valve being provided at a pipe between the receiver and the evaporator.

Effects of the Invention

According to the present disclosure, the transient depletion of a liquid refrigerant in the condenser and the receiver can be avoided, and thus the amount of refrigerant in a refrigeration circuit can be controlled. Thus, degradation in the performance of the refrigeration cycle apparatus can be avoided.

MODE FOR CARRYING OUT THE INVENTION

Figure 1:
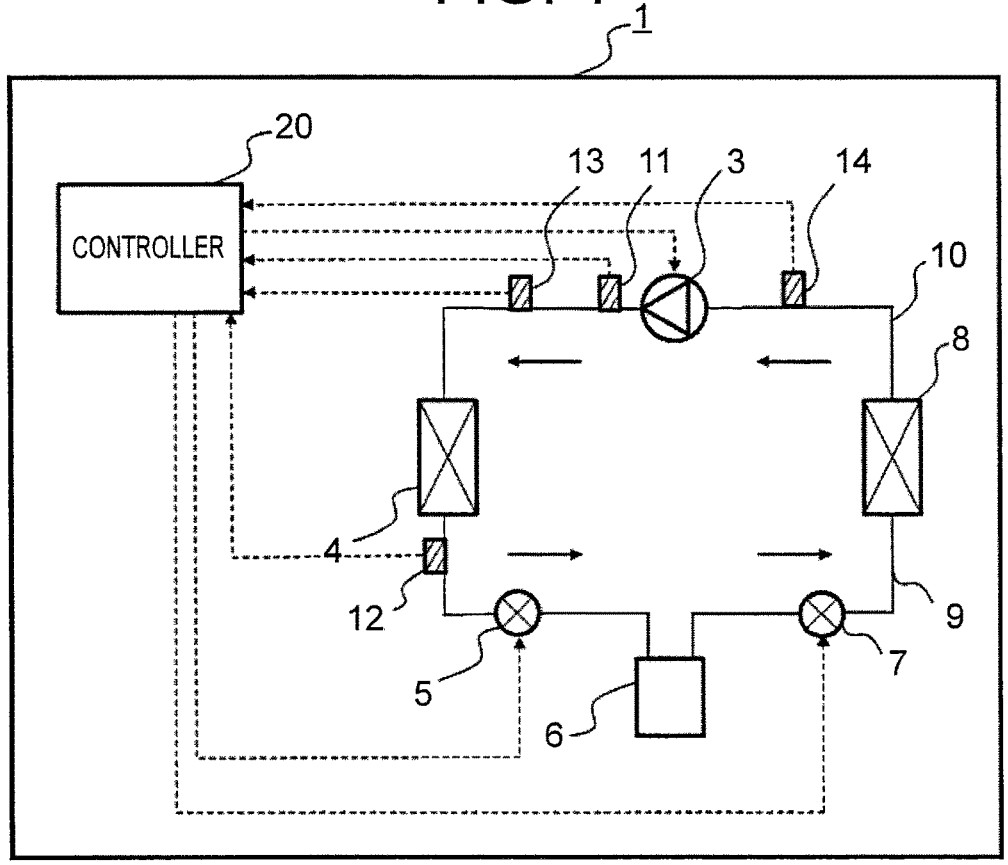
FIG. 1 is a schematic diagram illustrating an example of a configuration of a refrigeration cycle apparatus in a first embodiment.

Hereinafter, a refrigeration cycle apparatus 1 according to embodiments of the present disclosure will be described with reference to the accompanying drawings. Throughout the specification, components having the same reference characters in the drawings are the same or equivalent components.

First Embodiment

FIG. 1 is a schematic diagram illustrating an example of a configuration of the refrigeration cycle apparatus 1 in a first embodiment. As illustrated in FIG. 1, the refrigeration cycle apparatus 1 includes a controller 20, a compressor 3, a condenser 4, an upstream expansion valve 5, a receiver 6, a downstream expansion valve 7, and an evaporator 8.

The compressor 3, the condenser 4, the upstream expansion valve 5, the receiver 6, the downstream expansion valve 7, and the evaporator 8 are connected together by a pipe 9 to form a refrigerant circuit 10. In the refrigerant circuit 10, a refrigerant flows. Solid arrows in FIG. 1 represent the directions in which the refrigerant flows.

Some dotted arrows in FIG. 1 represent the flow of data detected from respective sensor units and transmitted to the controller 20, while the other dotted arrows represent the flow of control instructions from the controller 20 to the upstream expansion valve 5 and the downstream expansion valve 7. The details of the sensor units will be described later. Hereinafter, a description will be given on an example in which the refrigeration cycle apparatus 1 is an air conditioner, but the refrigeration cycle apparatus 1 is not particularly limited to the air conditioner.

The compressor 3 compresses sucked refrigerant and discharges the compressed refrigerant. For example, the compressor 3 may be configured so that its capacity (the amount of refrigerant delivered per unit time) is changed by freely varying its drive frequency using a not-illustrated inverter circuit or the like.

The condenser 4 is provided on the discharge side of the compressor 3. The condenser 4 condenses the refrigerant discharged from the compressor 3 to exchange heat with air. The condenser 4 exchanges heat between the refrigerant and the air. The condenser 4 condenses and liquefies the refrigerant, and heats the air.

The receiver 6 is a refrigerant container that stores the refrigerant. The receiver 6 is provided at the pipe 9 between the condenser 4 and the evaporator 8 and stores the excess liquefied refrigerant (liquid refrigerant) during operation. The receiver 6 stores the refrigerant discharged from the condenser 4. That is, the receiver 6 is configured to store the liquid refrigerant flowing out of the condenser 4.

The evaporator 8 exchanges heat between the refrigerant and the air. The evaporator 8 evaporates and vaporizes the refrigerant, and cools the air. The evaporator 8 vaporizes the refrigerant discharged from the receiver 6 to exchange heat with air.

The upstream expansion valve 5 is provided at the pipe 9 between the condenser 4 and the receiver 6 in the refrigerant circuit 10. The upstream expansion valve 5 is constituted by an expansion valve whose opening degree is variable, such as an electronic expansion valve, for example, and is configured to adjust the pressure and the flow rate of the refrigerant.

The downstream expansion valve 7 is provided at the pipe 9 between the receiver 6 and the evaporator 8 in the refrigerant circuit 10. The downstream expansion valve 7 is constituted by an expansion valve whose opening degree is variable, such as an electronic expansion valve, for example, and is configured to adjust the pressure and the flow rate of the refrigerant. The evaporator 8 is provided at the pipe 9 on the suction side of the compressor 3.

That is, the receiver 6 is provided at the pipe 9 between the upstream expansion valve 5 and the downstream expansion valve 7, and the amount of liquid refrigerant returning from the receiver 6 to the pipe 9 and the amount of liquid refrigerant retained from the pipe 9 in the receiver 6 change depending on an upstream expansion valve opening degree, which is the opening degree of the upstream expansion valve 5, and a downstream expansion valve opening degree, which is the opening degree of the downstream expansion valve V. That is, the amounts of liquid refrigerant in the condenser 4, the receiver 6, and the like, change depending on the upstream expansion valve opening degree and the downstream expansion valve opening degree.

The controller 20 controls the upstream expansion valve opening degree and the downstream expansion valve opening degree based on the opening degree ratio between the upstream expansion valve 5 and the downstream expansion valve 7. The controller 20 controls the upstream expansion valve opening degree and the downstream expansion valve opening degree in conjunction with each other so as to keep the opening degree ratio between the upstream expansion valve 5 and the downstream expansion valve 7 constant. In this regard, the expression "keep the opening degree ratio constant" does not mean that the opening degree ratio itself is a fixed value, but means that the upstream expansion valve opening degree and the downstream expansion valve opening degree are controlled in conjunction with each other so as to keep the opening degree ratio between the upstream expansion valve 5 and the downstream expansion valve 7 constant. The details of a control mechanism of the controller 20 will be described later.

The refrigeration cycle apparatus 1 also includes sensor units, such as a discharge temperature sensor 11, an outlet temperature sensor 12, a high-pressure pressure sensor 13, and a low-pressure pressure sensor 14. The discharge temperature sensor 11 and the high-pressure pressure sensor 13 are provided at the pipe 9 on the discharge side of the compressor 3. The discharge temperature sensor 11 detects the temperature of the refrigerant discharged from the compressor 3. The high-pressure pressure sensor 13 detects the pressure of the refrigerant discharged from the compressor 3.

The outlet temperature sensor 12 is provided at an outlet of the condenser 4 for the refrigerant and detects the temperature of the refrigerant flowing out of the condenser 4. The low-pressure pressure sensor 14 is provided at the pipe 9 on the suction side of the compressor 3 and detects the pressure of the refrigerant sucked into the compressor 3.

Figure 2:
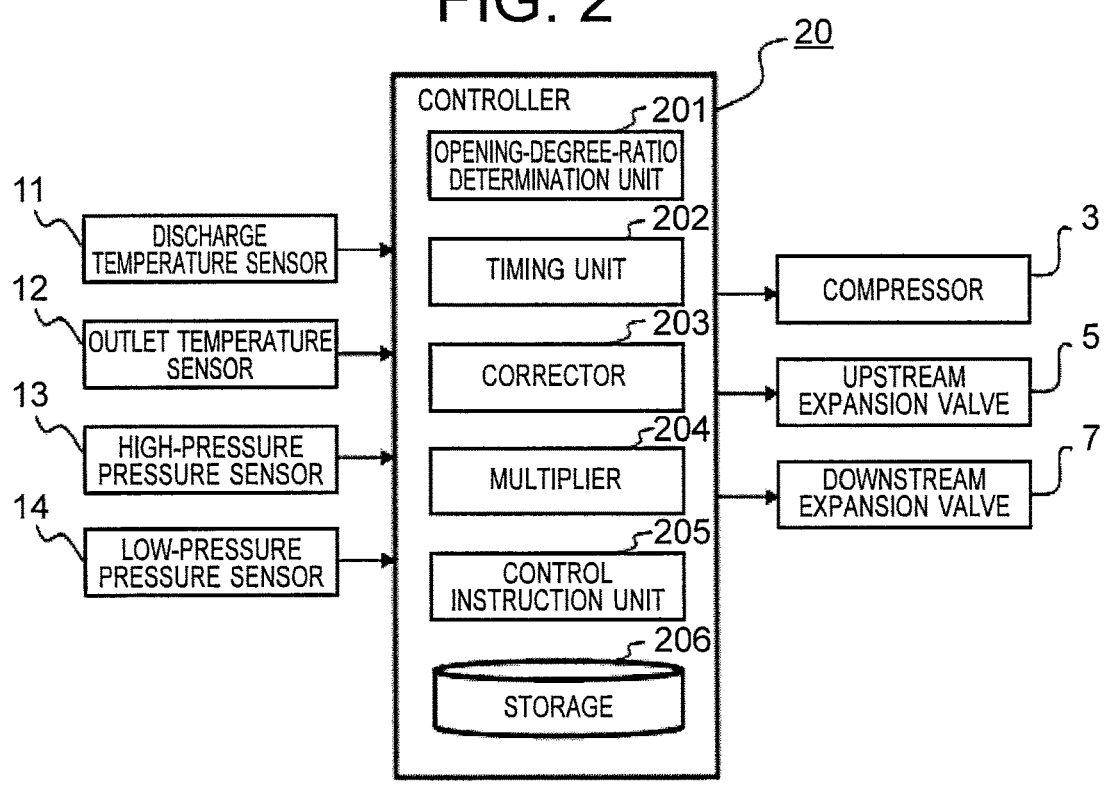
FIG. 2 is a functional block diagram illustrating functions of a controller in the first embodiment.

FIG. 2 is a functional block diagram illustrating the functions of the controller 20 in the first embodiment. As illustrated in FIG. 2, various sensors described above are connected to the controller 20, and data of the temperature, pressure, or the like are input from the sensors to the controller 20. Data, such as instructions from a user, are input to the controller 20 via a not-illustrated operating portion.

As illustrated in FIG. 2, the controller 20 has an opening-degree-ratio determination unit 201, a timing unit 202, a corrector 203, a multiplier 204, a control instruction unit 205, and a storage 206.

The control instruction unit 205 performs processing, such as calculation and determination, based on input data of the temperature or the like to control the components of the refrigeration cycle apparatus 1, including the compressor 3, the upstream expansion valve 5, and the downstream expansion valve 7.

The storage 206 is a device that stores data which is necessary for the processing performed by the control instruction unit 205. The storage 206 has a volatile storage device (not illustrated) such as a random access memory (RAM) that can store data temporarily, and a non-volatile auxiliary storage device (not illustrated) such as a hard disk and a flash memory that can store data for a long time.

The timing unit 202 is constituted by, for example, a timer or the like, and measures the time. The timing unit 202 is used for the determination or the like performed by the control instruction unit 205. For example, the control timing is specified based on the time measured by the timing unit 202.

The processing executed by the controller 20 can be constituted by, for example, a microcomputer having a control arithmetic processor such as a CPU (Central Processing Unit). The storage 206 stores data as a program of a processing procedure to be performed by the control instruction unit 205. The control arithmetic processor executes the processing based on the data of the program to achieve the control. Each processing unit can be constituted by a dedicated component (hardware).

The controller 20 of this embodiment is configured so that, when the controller 20 changes the downstream expansion valve opening degree to the calculated opening degree, the controller 20 calculates the upstream expansion valve opening degree by multiplying the calculated opening degree ratio between the upstream expansion valve 5 and the downstream expansion valve 7 by the downstream expansion valve opening degree. Further, the controller 20 is configured so that, when the controller 20 calculates the downstream expansion valve opening degree, the controller 20 uses a control gain that is determined with reference to the calculated opening degree ratio between the upstream expansion valve 5 and the downstream expansion valve 7.

Regardless of the example of this embodiment, it is sufficient that the controller 20 controls the upstream expansion valve opening degree and the downstream expansion valve opening degree based on the opening degree ratio between the upstream expansion valve 5 and the downstream expansion valve 7. The control method is not limited, and may be either feedback control or direct control.

Next, the operation of the refrigeration cycle apparatus 1 will be described with reference to FIG. 1. The high-temperature and high-pressure gaseous refrigerant compressed by the compressor 3 is discharged from a discharge outlet of the compressor 3, and flows into the condenser 4. The gaseous refrigerant flowing into the condenser 4 dissipates heat in the condenser 4, liquefies under high pressure, and flows out of the condenser 4. The refrigerant flowing out of the condenser 4 is depressurized by the upstream expansion valve 5 into an intermediate-temperature two-phase state and flows into the receiver 6. The two-phase refrigerant in the receiver 6 is separated into a gas phase and a liquid phase, and the liquid-phase refrigerant is discharged from the receiver 6.

The refrigerant discharged from the receiver 6 is depressurized by the downstream expansion valve 7 into a low-temperature two-phase state and flows into the evaporator 8. The low-temperature two-phase refrigerant flowing into the evaporator 8 absorbs heat in the evaporator 8 to be vaporized under a low pressure and flows out of the evaporator 8. The refrigerant flowing out of the evaporator 8 is sucked into and compressed by the compressor 3 again. By repeating these operations, the refrigeration cycle in the refrigeration cycle apparatus 1 is achieved.

In this regard, the refrigerant circuit 10 illustrated in FIG. 1 is the minimum configuration for achieving the refrigeration cycle according to the present disclosure and may have a configuration that includes a four-way valve for switching the flow path for the refrigerant, an accumulator for suppressing the liquid refrigerant from being sucked into the compressor 3, and the like, as needed. The condenser 4 and the evaporator 8 may not necessarily exchange heat between the refrigerant and the air. The condenser 4 and the evaporator 8 may exchange heat, for example, between the refrigerant and water. The object with which the refrigerant exchanges heat is not limited.

Figure 3:
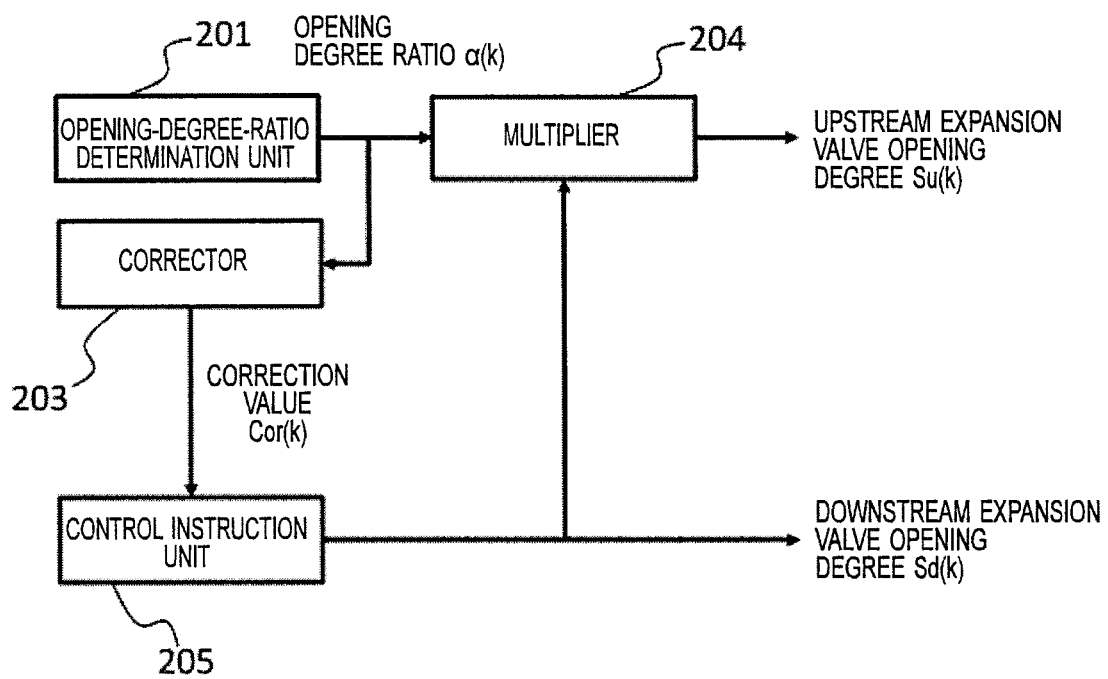
FIG. 3 is a diagram illustrating an example of a configuration of a part of the controller that controls an upstream expansion valve and a downstream expansion valve in the first embodiment.

FIG. 3 is a diagram illustrating an example of a configuration of a part of the controller 20 that controls the upstream expansion valve 5 and the downstream expansion valve 7 in the first embodiment. The number of steps in the repeated calculation is denoted by k. For example, when k is 5, the calculation is repeatedly performed five times.

As illustrated in FIG. 3, in the controller 20, the opening-degree-ratio determination unit 201 determines the opening degree ratio, the corrector 203 corrects the control gain based on the determined opening degree, and the control instruction unit 205 sends control instructions to the respective components. Regarding the upstream expansion valve 5, the multiplier 204 of the controller 20 calculates the upstream expansion valve opening degree by multiplying the determined opening degree ratio by the downstream expansion valve opening degree. Based on the calculated upstream expansion valve opening degree, the control instruction is sent to the upstream expansion valve 5.

In this embodiment, since the opening degree ratio is obtained by dividing the upstream expansion valve opening degree by the downstream expansion valve opening degree, the opening degree ratio is multiplied by the downstream expansion valve opening degree. However, if the opening degree ratio is obtained by dividing the downstream expansion valve opening degree by the upstream expansion valve opening degree, the controller may perform control to calculate the downstream expansion valve opening degree by multiplying the opening degree ratio by the upstream expansion valve opening degree.

The control instruction unit 205 is constituted by a PI controller of a positional type that calculates the downstream expansion valve opening degree that causes a discharge temperature to follow a target value, i.e., the target discharge temperature. The control instruction unit 205 inputs, into the PI controller, a deviation between the discharge temperature acquired from the discharge temperature sensor 11 and the predetermined target discharge temperature, calculates a downstream expansion valve opening degree that causes the discharge temperature to follow the target discharge temperature, and controls the downstream expansion valve opening degree to be the calculated value.

The predetermined refrigerant temperature to be controlled by the control instruction unit 205 does not need to be the discharge temperature, but may be a temperature that correlates with the discharge temperature, such as a compressor suction superheat degree, a compressor discharge superheat degree, an evaporator outlet superheat degree, and a condenser inlet superheat degree. Alternatively, the control instruction unit 205 may control a compressor suction dryness or an evaporator outlet dryness, rather than the temperature.

The control performed by the control instruction unit 205 does not need to be the PI control, but may be dynamic feedback control such as P control, PID control or model prediction control, or may be dynamic or static control according to the predefined table or the like. In the feedback control, the control quantity is adjusted by the control gain.

The opening-degree-ratio determination unit 201 determines an opening degree ratio $\alpha=Su/Sd$ between an upstream expansion valve opening degree Su and a downstream expansion valve opening degree Sd. This determined opening degree ratio is corrected to an appropriate opening degree ratio as appropriate. The opening-degree-ratio determination unit 201 determines the opening degree ratio so that the physical quantity correlated with the amount of liquid refrigerant in the condenser 4 or the receiver 6 as measured by the sensor unit is within an appropriate range.

Here, the physical quantity is, for example, the supercooling degree. In this embodiment, the supercooling degree is described as the physical quantity, but the physical quantity is not limited thereto and may be any physical quantity that correlates with the amount of liquid refrigerant in the condenser 4 or the receiver 6. The appropriate range refers to an appropriate range of the amount of liquid refrigerant in the condenser 4 or the receiver 6. In this embodiment, for example, this range corresponds to a predetermined range from the minimum supercooling degree (SCmin) to the maximum supercooling degree (SCmax). The details of the determination of the opening degree ratio will be described later.

The multiplier 204 calculates the upstream expansion valve opening degree by multiplying the downstream expansion valve opening degree Sd that is output by the control instruction unit 205, by the opening degree ratio α determined by the opening-degree-ratio determination unit 201. That is, the upstream expansion valve opening degree is calculated according to the following Equation 1, thereby performing the control.

[Equation 1]

$$Su(k)=\alpha(k) \times Sd(k) \quad \text{Equation 1}$$

The corrector 203 corrects the control gain, which is a control parameter of the control instruction unit 205, at least based on the opening degree ratio α calculated by the opening-degree-ratio determination unit 201. More specifically, based on the opening degree ratio α, the control gain of a series expansion valve opening degree, which is a composite opening degree of the upstream expansion valve opening degree and the downstream expansion valve opening degree, is corrected to a control gain of the downstream expansion valve 7. The details of the correction method will be described later.

Figure 4:
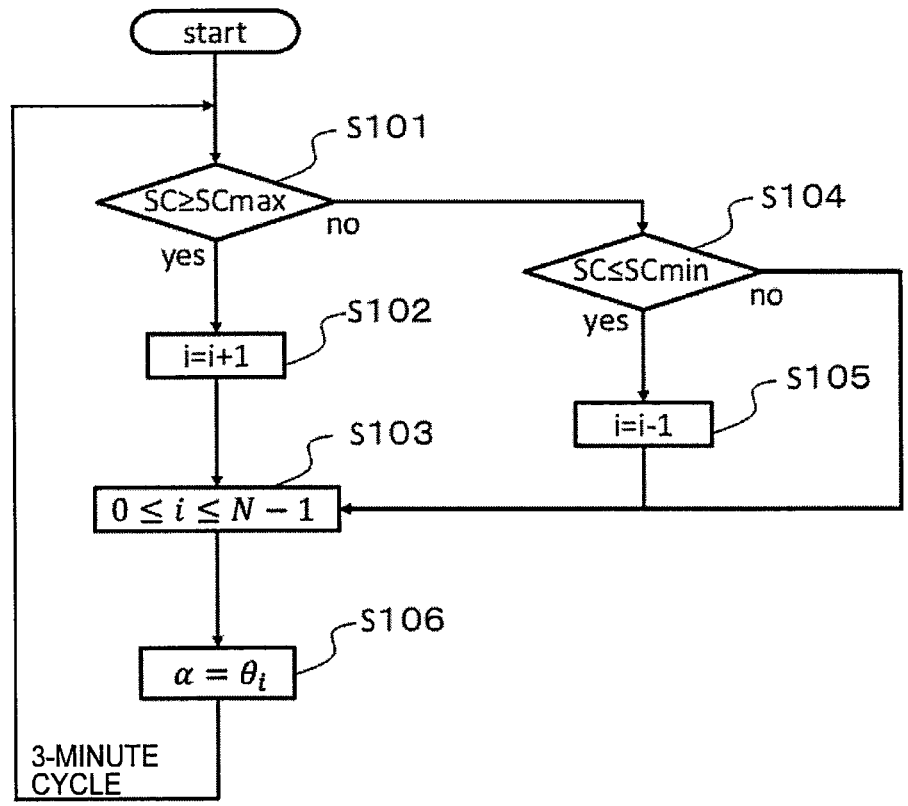
FIG. 4 is a flowchart of determination of an opening degree ratio that is performed by an opening-degree-ratio determination unit in the first embodiment.

FIG. 4 is a flowchart of determination of the opening degree ratio that is performed by the opening-degree-ratio determination unit 201 in the first embodiment. First, in step S101, the opening-degree-ratio determination unit 201 determines whether or not the supercooling degree (SC) is greater than or equal to the predetermined maximum supercooling degree (SCmax). If the supercooling degree (SC) is greater than or equal to the maximum supercooling degree (SCmax) (if Yes), the operation proceeds to step S102. In step S102, the opening-degree-ratio determination unit 201 adds 1 to an index i of an array. Then, the operation proceeds to step S103.

If No in step S101, the operation proceeds to step S104, in which the opening-degree-ratio determination unit 201 determines whether or not the supercooling degree (SC) is less than or equal to the predetermined minimum supercooling degree (SCmin). If the supercooling degree (SC) is less than or equal to the predetermined minimum supercooling degree (SCmin) (if Yes), the operation proceeds to step S105, in which the opening-degree-ratio determination unit 201 subtracts 1 from the index i of the array. Then, the operation proceeds to step S103. If No in step S104, the operation proceeds to step S103.

In step S103, the opening-degree-ratio determination unit 201 rounds the index i of the array to an integer between zero and N−1, and the operation then proceeds to step S106. Here, N is the number of elements of the array and is a constant which is preliminarily determined. In step S106, the opening-degree-ratio determination unit 201 substitutes the i-th element of the array α into the opening degree ratio α to determine and output the opening degree ratio.

After elapse of three minutes, the operation returns to step S101. Whether three minutes have elapsed or not is determined by counting the time using the timing unit 202 or the like. In this embodiment, it is checked every three minutes whether or not the supercooling degree is less than or equal to the minimum supercooling degree, or whether or not the supercooling degree is greater than or equal to the maximum supercooling degree. However, the checking is not limited to this example, and the time interval for the checking can be adjusted to an appropriate time interval, such as two minutes or one minute. Here, the array θ is defined for the index i, for example, by the following Equation 2.

[Equation 2]

$$\theta_i = p^{2(i+1)-N-1}/2(N-1), i=0, N-1 \quad \text{Equation 2}$$

Here, p is the maximum value of the ratio (dPus/dPds) of a pressure drop dPus due to the upstream expansion valve 5 to a pressure drop dPds due to the downstream expansion valve 7, i.e., the maximum differential pressure ratio, and is a constant that is preliminarily determined. As can be clearly seen from Equation 2, el depends on a constant and does not depend on time or sensor values. Thus, it is not necessary to preform calculation in real time, and thus the calculation load on the controller 20 does not increase.

Equation 2 is adjusted so that p is raised to the power of −½ to ½ while the index i moves from 0 to N−1. That is, as the index i increases, the opening degree ratio increases. As the index I decreases, the opening degree ratio decreases.

That is, the opening-degree-ratio determination unit 201 determines the opening degree ratio so that the opening degree ratio increases when the measured supercooling degree is greater than or equal to the maximum supercooling degree, and so that the opening degree ratio decreases when the measured supercooling degree is less than or equal to the minimum supercooling degree. The opening-degree-ratio determination unit 201 uses Equation 2 to determine the opening degree ratio so that the opening degree ratio increases in a stepwise manner in accordance with the period during which the measured supercooling degree is greater than or equal to the maximum supercooling degree, and so that the opening degree ratio decreases in a stepwise manner in accordance with the period during which the measured supercooling degree is less than or equal to the minimum supercooling degree.

Thus, the opening degree ratio can be determined so that the supercooling degree is held within the appropriate range, which allows for energy saving. In the following, the meaning in terms of physics of the equation that defines θ will be explained. Since θi (i=0, . . . , N−1) is the ratio between the upstream expansion valve opening degree Su and the downstream expansion valve opening degree Sd, the following Equation 3 is satisfied.

[Equation 3]

$$Sd = \theta_i \times Su \qquad \text{Equation 3}$$

Meanwhile, assuming that the flow rate of the refrigerant is Gr [kg/s], the differential pressure dPus due to the upstream expansion valve 5 and the differential pressure dPds due to the downstream expansion valve 7 have the relationship given by the following Equation 4. Here, C is a constant.

[Equation 4]

$$Gr = C*Su\sqrt{dPus} = C*Sd\sqrt{dPds} \qquad \text{Equation 4}$$

The following Equation 5 is obtained from the Equations 2 to 4.

[Equation 5]

$$\frac{dPus}{dPds} = \theta_i^2 = p^{2(i+1)-N-1/N-1} \qquad \text{Equation 5}$$

Figure 5:
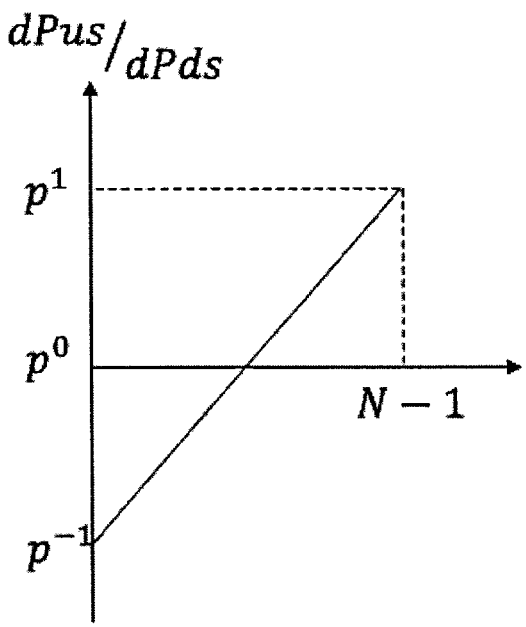
FIG. 5 is a diagram for explaining Equation 5 in the first embodiment.

FIG. 5 is a diagram for explaining Equation 5 in the first embodiment. FIG. 5 is a graph representing Equation 5 using a logarithmic scale on the y-axis. In FIG. 5, the horizontal axis represents the index of the array θ while the vertical axis represents the differential pressure ratio dPus/dPds. In other words, the index of θ defines the ratio of the pressure drop dPus due to the upstream expansion valve 5 to the pressure drop dPds due to the downstream expansion valve 7.

Figure 6:
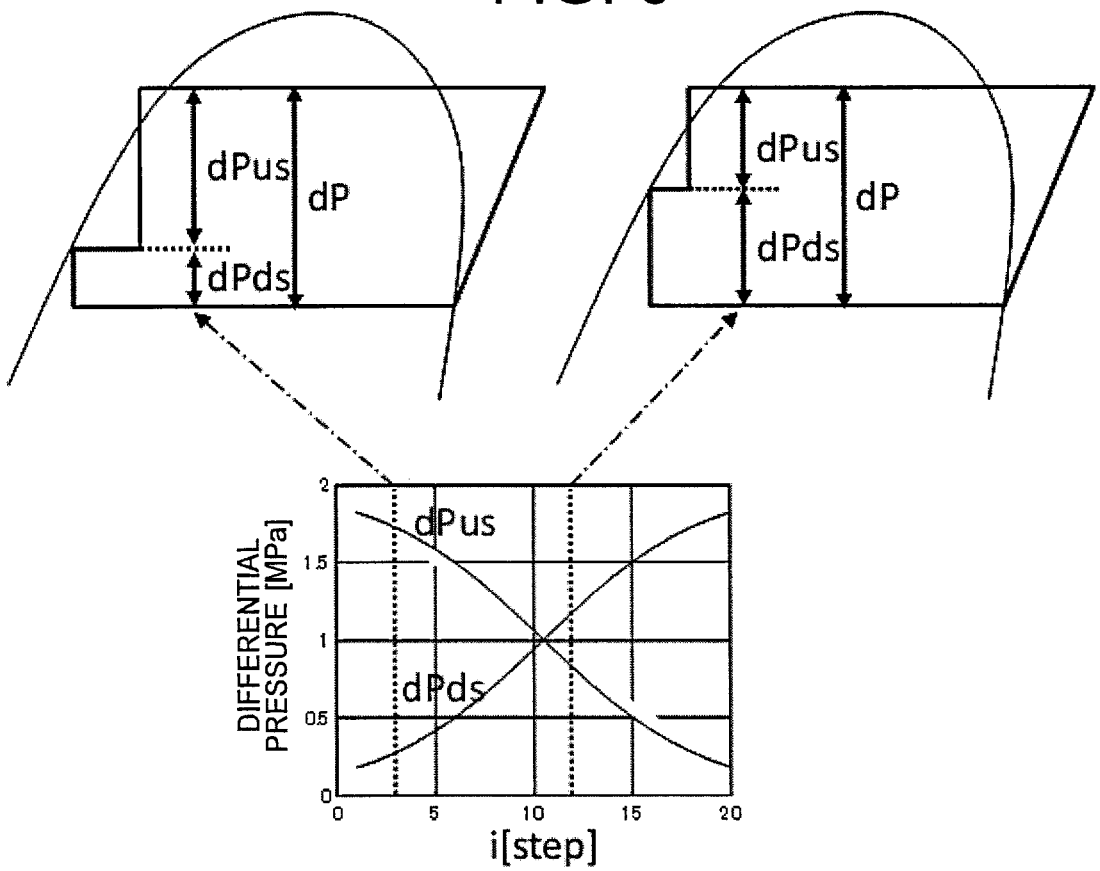
FIG. 6 is a diagram illustrating an example for explaining the graph illustrated in FIG. 5 in the first embodiment.

FIG. 6 is a diagram illustrating an example for explaining the graph illustrated in FIG. 5 in the first embodiment. FIG. 6 shows how the differential pressures dPus and dPds of the respective expansion valves for each element of θ change when the sum dP of the pressure drop dPus of the upstream expansion valve 5 and the pressure drop dPds of the downstream expansion valve 7 is fixed at 2 MPa. FIG. 6 suggests that by varying the index of 0, a medium pressure can be changed, and consequently the amount of liquid refrigerant in the receiver 6 (and as a result the supercooling degree) can be controlled.

As for the operation, when the supercooling degree is intended to increase, the opening degree ratio may be updated in the direction of closing the upstream expansion valve 5 by decreasing the index of θ. Conversely, when the supercooling degree is intended to decrease, the opening degree ratio may be updated in the direction of opening the upstream expansion valve 5 by increasing the index of θ.

That is, when the supercooling degree is intended to increase, the opening degree ratio is changed so as to close the upstream expansion valve 5, whereas when the supercooling degree is intended to decrease, the opening degree ratio is changed so as to open the upstream expansion valve 5. Therefore, the conditions for varying the index of θ are associated with the supercooling degree (SC). This is the reason for step S101 and step S104 in FIG. 4. In the flow, the index of θ is varied in order to control the supercooling degree to be within the appropriate range.

In FIG. 4, the most basic condition is used as the conditional statement for varying the index i. However, the conditional statement for varying the index i is not necessarily the condition described in FIG. 4. For example, the condition may be given so that the index is increased when the opening degree of the downstream expansion valve 7 is larger than the predetermined opening degree, whereas the index is decreased when the opening degree of the downstream expansion valve 7 is smaller than the predetermined opening degree. Alternatively, the condition may be given so that the index is neither increased nor decreased when the downstream expansion valve 7 is not within the predetermined opening degree range.

Alternatively, the condition may be given so that the index is not decreased when the discharge temperature is higher than the target value by a predetermined temperature. Alternatively, the combination may be given by combining the above-described examples.

In FIG. 4, each of SCmax and SCmin that define the appropriate range of the supercooling degree may be a constant or a value that varies depending on the operating state. For example, a value which occasionally changes and which is calculated from the condensation temperature, the suction temperature, and the appropriate temperature efficiency may be defined as SCmax or SCmin.

Although the amount of increase or decrease of the index is set to ±1 in FIG. 4, the amount of increase or decrease may be changed depending on the conditions. For example, it is possible to set i=i+1 if SC>SCmax1, and i=i+2 if SC>SCmax2. The relationship between θ and i is not necessarily defined by Equation 2, and it is sufficient that θ and I have monotonically decreasing or monotonically increasing relationship.

As described above, in FIG. 4, an index update period is set to three minutes, but it is not necessarily three minutes, and may be any period. That is, this period is not necessarily synchronized with the control cycle of the control instruction unit 205.

In the conditional statement in FIG. 4, the supercooling degree is used as an indicator for the determination condition, but the indicator is not necessarily the supercooling degree. Essentially, it is sufficient that the conditional statement is made so as to keep the amount of liquid refrigerant in the condenser 4 or the receiver 6 within the appropriate range. In the example of FIG. 4, in order to keep the amount of liquid refrigerant in the condenser 4 or the receiver 6 within the appropriate range, the supercooling degree, which is a physical quantity that correlates with the amount of liquid refrigerant in the condenser 4 or the receiver 6, is used as the indicator for the determination condition. However, for example, when a sensor is provided to measure the amount of liquid refrigerant in the condenser 4, the amount of liquid refrigerant in the condenser 4 may be used as the indicator. Alternatively, for example, when a sensor is provided to measure the amount of liquid refrigerant in the receiver 6, the amount of liquid refrigerant in the receiver 6 may be used as the indicator.

Alternatively, a combination of these indicators may be used as the indicator of the conditional statement. When the amount of liquid refrigerant in the condenser 4 is not less than the appropriate range, the opening degree ratio may be updated in the direction of opening the upstream expansion valve 5. On the other hand, when the amount of liquid refrigerant in the condenser 4 is not more than the appropriate range, the opening degree ratio may be updated in the direction of closing the upstream expansion valve 5. Similarly, when the amount of liquid refrigerant in the receiver 6 is not less than the appropriate range, the opening degree ratio may be updated in the direction of closing the upstream expansion valve 5. On the other hand, when the amount of liquid refrigerant in the receiver 6 is not more than the appropriate range, the opening degree ratio may be updated in the direction of opening the upstream expansion valve 5.

Next, the operation of the corrector 203 will be described. The corrector 203 calculates a control gain correction value Cor by the following Equation 6 from the opening degree ratio α calculated by the opening-degree-ratio determination unit 201, and thereby corrects the control gain, which is a control parameter of the control instruction unit 205.

[Equation 6]

$$Cor(k) = \sqrt{\frac{1}{1 + \frac{1}{\alpha^2}}} \qquad \text{Equation 6}$$

The control gains of the PI control, which constitute the control instruction unit 205, are corrected by the control gain correction value Cor according to the following Equations 7 and 8. Although PI control is used here, the control is not limited thereto, and P control, PID control, or the like, may be used.

[Equation 7]

$$kp = \frac{kp\_base}{Cor(k)} \qquad \text{Equation 7}$$

[Equation 8]

$$ki = \frac{ki\_base}{Cor(k)} \qquad \text{Equation 8}$$

Here, kp and ki are a proportional gain and an integral gain of the PI controller, respectively, and kp_base and ki_base are a reference proportional gain and a reference integral gain (prior to the correction), respectively. The derivation of Equations 7 and 8 will be described below.

First, the reference control gains kp_base and ki_base are designed for the series expansion valve opening degree. Here, the series expansion valve opening degree is the composite opening degree when the upstream expansion valve 5 and downstream expansion valve 7 are considered as one expansion valve. In this regard, the series expansion valve opening degree Sser has the relationship, which is given by the following Equation 9, with the upstream expansion valve opening degree Su and the downstream expansion valve opening degree Sd.

[Equation 9]

$$Sser = \sqrt{\frac{Su^2 Sd^2}{Su^2 + Sd^2}} \qquad \text{Equation 9}$$

By designing the reference control gains for the series expansion valve opening degree, the series expansion valve opening degree that causes the discharge temperature to follow the target value is derived from the proportional gain and the integral gain, which serve as the bases. The reference control gains are designed for the series expansion valve opening degree, but the control instruction unit 205 of FIG. 3 outputs the downstream expansion valve opening degree rather than the series expansion valve opening degree. Thus, the series expansion valve opening degree Sser is converted to the downstream expansion valve opening degree Sd by expanding Equation 10.

[Equation 10]

$$Sser = \sqrt{\frac{Su^2 Sd^2}{Su^2 + Sd^2}} \qquad \text{Equation 10}$$

$$= \sqrt{\frac{(\alpha * Sd)^2 Sd^2}{(\alpha * Sd)^2 + Sd^2}}$$

$$= Sd \sqrt{\frac{1}{1 + \frac{1}{\alpha^2}}}$$

[Equation 11]

$$Sd = \frac{1}{\sqrt{1 + \frac{1}{\alpha^2}}} Sser \qquad \text{Equation 11}$$

$$= \frac{1}{Cor} Sser$$

From the above, the conversion from Sser to Sd can be performed by the conversion represented by Equation 11. The conversion is incorporated in the control gains in advance. This implies that the control gains for the base series expansion valve opening degree are divided by Cor, as in Equations 7 and 8.

As described above, the control gains for the series expansion valve opening degree are corrected from the opening degree ratio α through Equations 6 to 8, but other correction equations, relationship equations, or tables may be used. Essentially, the corrector 203 performs correction so that the control gain of the downstream expansion valve 7 increases as the opening degree ratio α decreases, and so that the control gain of the downstream expansion valve 7 decreases as the opening degree ratio α increases. Thus, in the corrector 203, the correction is defined to effectively exhibit a negative correlation between the opening degree ratio α and the control gain.

In addition, although the control gain correction method for the opening degree ratio α has been described above, other corrections may be further added thereto.

The object to be corrected is not limited to the control gains of the PI control, and essentially it is sufficient that a control parameter of the control instruction unit 205 is corrected so that a change in the operating amount output by the control instruction unit 205 decreases when the opening degree ratio α is large.

As described above, the opening-degree-ratio determination unit 201 calculates the opening degree ratio α, and the calculated value and the downstream expansion valve opening degree are input into the multiplier 204, whereby the upstream expansion valve opening degree is calculated. Thus, it is possible to stably control the supercooling degree to be an appropriate value or within an appropriate range with high accuracy. That is, the upstream expansion valve opening degree and the downstream expansion valve opening degree are operated in conjunction with each other so as to keep the opening degree ratio constant, and therefore it is possible to enable the transition of the liquid refrigerant in the condenser 4 or the receiver 6 to a desired refrigerant state without significantly varying the distribution of the refrigerant transiently. This can be said to be effective in preventing transient depletion of the liquid refrigerant in the condenser 4 or the receiver 6.

As described above, in this embodiment, the upstream expansion valve opening degree and the downstream expansion valve opening degree are operated in conjunction with each other so as to keep constant the opening degree ratio. Thus, when controlling the downstream expansion valve opening degree, variations in the flow rate of the liquid refrigerant on the upstream and downstream sides of the receiver 6 are suppressed. Therefore, variations in the amount of refrigerant in the condenser 4 or the receiver 6 can be suppressed, and the transient depletion of the liquid refrigerant can be suppressed. Therefore, even while the downstream expansion valve opening degree is being changed, the amount of refrigerant in the refrigerant circuit 10 can be controlled by using the amount of liquid refrigerant stored in the condenser 4 or the receiver 6 to thereby control the upstream expansion valve 5 and the downstream expansion valve 7. Accordingly, the reduction in the controllability of the upstream expansion valve 5 and the downstream expansion valve 7 can be avoided.

By appropriately describing the conditional statement for the opening-degree-ratio determination unit 201, the optimal operating state can be held without imparting the refrigeration cycle even when no supercooling degree occurs, such as when the shortage of the refrigerant occurs or when long piping is installed. Further, by incorporating information of the object to be controlled by the control instruction unit 205 into the conditional statement for the opening-degree-ratio determination unit 201, it is possible to preferentially perform the transient control of the object to be controlled by the control instruction unit 205. In this way, such a flexible control can be achieved.

As described above, the high-accuracy control can be achieved by correcting the control parameters for the control instruction unit 205 by the corrector 203, regardless of the opening degree balance between the upstream expansion valve opening degree and the downstream expansion valve opening degree. In this regard, the opening degree balance refers to the magnitude relationship between the upstream expansion valve opening degree and the downstream expansion valve opening degree. The reason for focusing on the opening degree balance is that the degree of influence of each expansion valve onto the refrigeration cycle generally changes depending on the opening degree balance.

For example, when the upstream expansion valve opening degree is much smaller than the downstream expansion valve opening degree, a change in the upstream expansion valve opening degree hardly influences the refrigeration cycle. Conversely, when the upstream expansion valve opening degree is much larger than the downstream expansion valve opening degree, even a slight change in the upstream expansion valve opening degree results in a significant influence on the refrigeration cycle.

The degree of influence of each expansion valve opening degree onto the refrigeration cycle changes depending on the opening degree balance. Thus, when a fixed control gain is used, failure such as hunting or an increase in time to reach the target value may occur due to the change in the opening degree balance. In this embodiment, the correction that takes into account the opening degree balance is performed on the control gain, and thus high controllability can be maintained at any opening degree balance.

Figure 7:
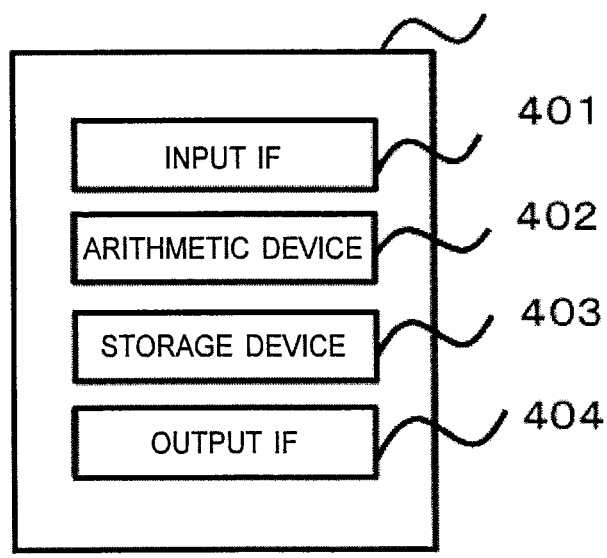
FIG. 7 is a hardware configuration diagram illustrating a configuration of the controller in the first embodiment.

FIG. 7 is a hardware configuration diagram illustrating a configuration of the controller 20 in the first embodiment. The controller 20 is constituted by an input interface 401, an arithmetic device 402, which is a Central Processing Unit (CPU) or the like, a storage device 403, and an output interface 404. The interface is hereafter referred to as IF.

The functions of the opening-degree-ratio determination unit 201, the timing unit 202, the corrector 203, the multiplier 204, and the control instruction unit 205 of the controller 20 are implemented by causing the arithmetic device 402 to execute programs. Data including data acquired from the sensor unit and data acquired from the operation unit are stored in the storage device 403.

Data acquired from the sensor unit, data acquired from the operation unit and other data are input from the input IF 401. Input may be received directly from the user or from an external data server, and an input source is not limited. The output IF 404 outputs control information including control instructions based on the calculated opening degree ratio.

In this regard, the IF is a wired port such as a cable port, a USB port, a direct connection port, or a wireless network port. The storage device 403 is a storage medium such as an HDD, an SSD, or a flash memory.

Second Embodiment

Figure 8:
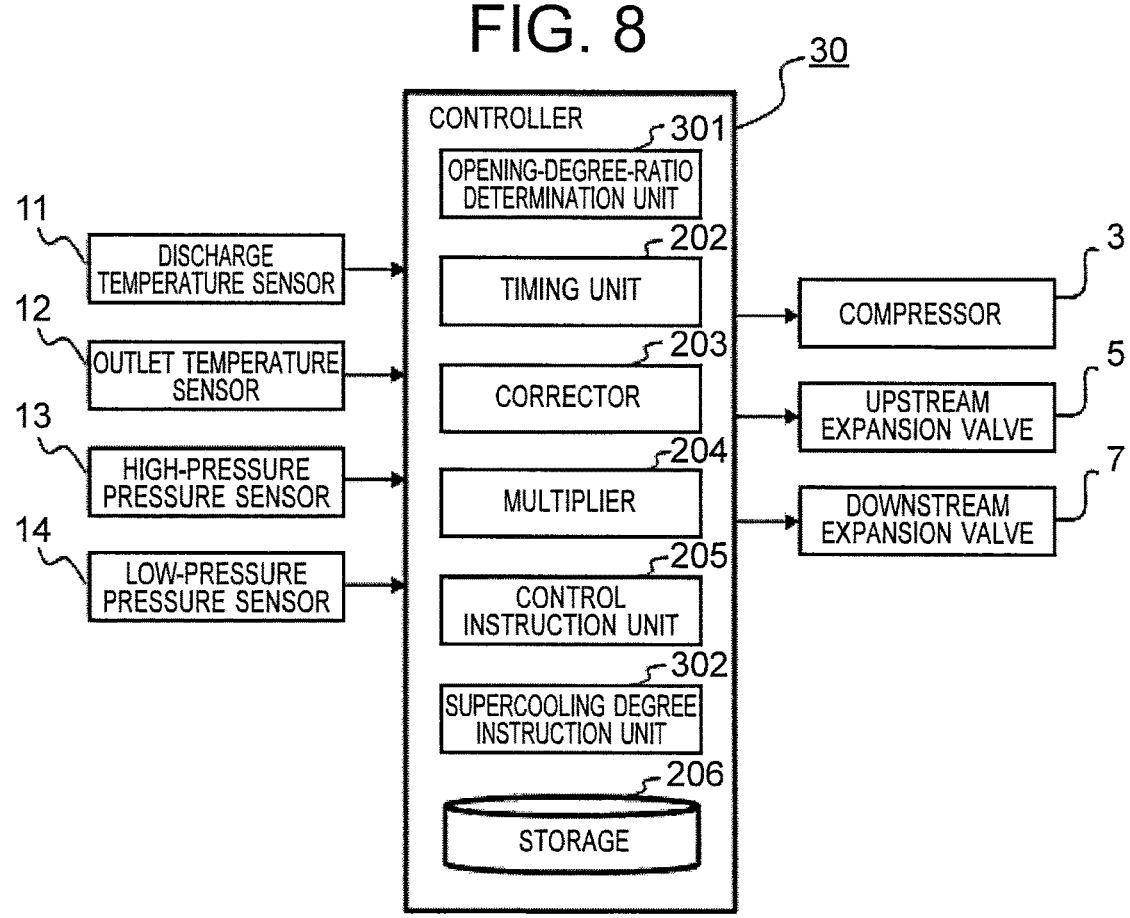
FIG. 8 is a configuration diagram illustrating an example of a configuration of a controller in a second embodiment.

FIG. 8 is a configuration diagram illustrating an example of a configuration of a controller 30 in a second embodiment. The second embodiment differs from the first embodiment in the controller 30. More specifically, the second embodiment differs from the first embodiment in the processing performed by an opening-degree-ratio determination unit 301 of the controller 30 and in that the controller 30 has a supercooling degree instruction unit 302. Other configurations and operations are the same as those of the first embodiment, and a detailed description thereof is omitted herein.

The opening-degree-ratio determination unit 301 of the second embodiment differs from the opening-degree-ratio determination unit 201 of the first embodiment in that the opening-degree-ratio determination unit 301 calculates the opening degree ratio α not from the discrete index i by the flowchart based on the conditional statement, but from a continuous argument output from the supercooling degree instruction unit 302.

The supercooling degree instruction unit 302 performs control such as feedback control using the supercooling degree as the control quantity. Various arguments are used depending on the situation when controlling the supercooling degree so that the supercooling degree follows the target supercooling degree.

The control performed by the supercooling degree instruction unit 302 is, for example, PI control, but is not necessarily PI control. It may be dynamic feedback control such as P control, PID control or model prediction control, or may be dynamic or static control in accordance with the preliminarily determined table or the like.

Figure 9:
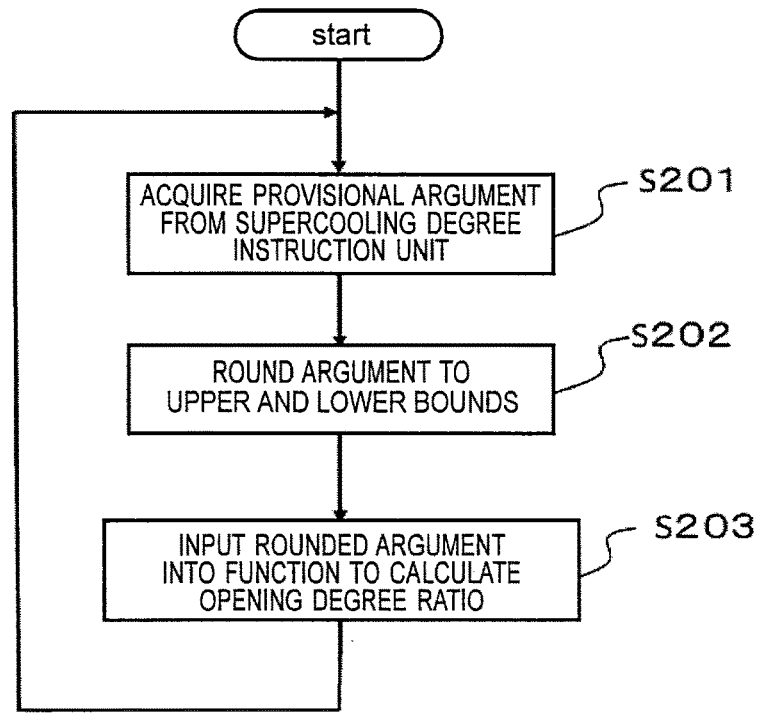
FIG. 9 is a flowchart of processing by which an opening-degree-ratio determination unit specifies the opening degree ratio in the second embodiment.

FIG. 9 is a flowchart of processing by which the opening-degree-ratio determination unit 301 specifies the opening degree ratio in the second embodiment. In the first embodiment, the index is increased or decreased by determining whether the supercooling degree is greater than or equal to the maximum supercooling degree or whether the supercooling degree is less than or equal to the minimum supercooling degree, and the opening degree ratio is specified by inputting the increased or decreased index into the function. However, in this embodiment, the opening degree ratio is specified by inputting the changed argument into a function to cause the supercooling degree provided by the supercooling degree instruction unit 302 to follow the target value.

First, the supercooling degree instruction unit 302 outputs a provisional argument for controlling the supercooling degree to be the target supercooling degree. In step S201, the opening-degree-ratio determination unit 301 acquires the provisional argument output from the supercooling degree instruction unit 302. In step S202, the opening-degree-ratio determination unit 301 rounds the provisional argument to specified upper and lower bounds and outputs the rounded argument. In step S203, the opening-degree-ratio determination unit 301 uses the rounded argument as the input, and then outputs, as the opening degree ratio α, the result of calculation on the input rounded argument using a certain function. Here, the certain function may be Equation 2 or any other function. Essentially, the function may be any function that is a monotonically non-decreasing function with respect to the argument.

In the above description, the supercooling degree instruction unit 302 outputs the provisional argument for controlling the supercooling degree to be the target supercooling degree, but it is also possible not to control the supercooling degree to be the target supercooling degree. The supercooling degree instruction unit 302 may output a provisional argument for holding the supercooling degree within a predetermined allowable supercooling degree range.

With the configuration described above, the whole operations of the upstream expansion valve and the downstream expansion valve can be continuously achieved. Thus, smooth and bumpless control is enabled, and continuous linkage between the operating condition and the operating state can be achieved. Thus, an advantage of enabling the evaluation test to be efficiently performed is obtained. In addition, the reproducibility of the control is also improved, and thus a high-quality refrigeration cycle apparatus can be provided The respective embodiments can be combined freely within the scope of the present disclosure, and they can be modified or omitted as appropriate. Although the embodiments have been described in detail, the above description is illustrative in all aspects, and the embodiments are not limited thereto. Numerous modifications not exemplified herein may be envisioned without departing from the scope of the embodiments.

DESCRIPTION OF REFERENCE CHARACTERS

1: refrigeration cycle apparatus, 3: compressor, 4: condenser, 5: upstream expansion valve, 6: receiver, 7: downstream expansion valve, 8: evaporator, 9: pipe, 10: refrigerant circuit, 11: discharge temperature sensor, 12: outlet temperature sensor, 13: high-pressure pressure sensor, 14: low-pressure pressure sensor, 20, 30: controller, 201, 301: opening-degree-ratio determination unit, 202: timing unit, 203: corrector, 204: multiplier, 205: control instruction unit, 206: storage, 302: supercooling degree instruction unit.

What is claimed is:

1. A refrigeration cycle apparatus comprising:
   a compressor to compress a sucked refrigerant;
   a condenser to condense the refrigerant discharged from the compressor to exchange heat;
   a receiver to store the refrigerant discharged from the condenser;
   an evaporator to evaporate the refrigerant discharged from the receiver to exchange heat;
   an upstream expansion valve provided at a pipe between the condenser and the receiver;
   a downstream expansion valve provided at a pipe between the receiver and the evaporator;
   a controller having a processor and a memory with a computer readable program stored therein, the controller controlling an opening degree of the upstream expansion valve and an opening degree of the downstream expansion valve in conjunction with each other so as to keep an opening degree ratio between the upstream expansion valve and the downstream expansion valve within a predetermined range; and
   a sensor to measure a physical quantity that correlates with an amount of liquid refrigerant in the condenser or the receiver,
   wherein the controller determines the opening degree ratio so as to hold the physical quantity within a predetermined range.

2. The refrigeration cycle apparatus according to claim 1, wherein the physical quantity is a supercooling degree, and
   wherein the controller determines the opening degree ratio so that the opening degree ratio increases when the measured supercooling degree is greater than or equal to a maximum supercooling degree, and so that the opening degree ratio decreases when the measured supercooling degree is less than or equal to a minimum supercooling degree.

3. The refrigeration cycle apparatus according to claim 2, wherein the controller determines the opening degree ratio so that the opening degree ratio increases in a stepwise manner in accordance with a period during which the supercooling degree is greater than or equal to the maximum supercooling degree, and so that the opening degree ratio decreases in a stepwise manner in accordance with a period during which the supercooling degree is less than or equal to the minimum supercooling degree.

4. The refrigeration cycle apparatus according to claim 2, wherein the controller uses the supercooling degree as a control quantity,
   wherein the controller determines the opening degree ratio so that the opening degree ratio increases as an operating amount output from the supercooling degree instruction unit so as to control the supercooling degree increases.

5. The refrigeration cycle apparatus according to claim 1, wherein the controller controls an opening degree of the downstream expansion valve to cause a discharge temperature to follow a target value through feedback control with a control gain, and
   the controller corrects a control gain of a series expansion valve opening degree to the control gain of the downstream expansion valve based on the opening degree ratio.

6. The refrigeration cycle apparatus according to claim 5, wherein the controller performs the correction so that the control gain of the downstream expansion valve increases as the opening degree ratio decreases, and so that the control gain of the downstream expansion valve decreases as the opening degree ratio increases.

7. A refrigeration cycle method comprising:
   compressing a sucked refrigerant in a compressor;
   condensing the refrigerant discharged from the compressor in a condenser to exchange heat with air;
   storing the refrigerant discharged from the condenser in a receiver;
   evaporating the refrigerant discharged from the receiver in an evaporator to exchange heat with air;
   measuring a physical quantity that correlates with an amount of liquid refrigerant in the condenser or the receiver,
   controlling an opening degree of an upstream expansion valve and an opening degree of a downstream expansion valve in conjunction with each other so as to keep an opening degree ratio between the upstream expansion valve and the downstream expansion valve within a predetermined range, the upstream expansive valve being provided at a pipe between the condenser and the receiver, the downstream expansive valve being provided at a pipe between the receiver and the evaporator; and controlling the opening degree ratio so as to hold the physical quantity within a predetermined range.

8. The refrigeration cycle apparatus according to claim 1, further comprising:

a first sensor to measure a first physical quantity that correlates with a temperature of the refrigerant discharged from the compressor; and a second sensor to measure the physical quantity which is a second physical quantity;

wherein the controller controls the opening degree of the downstream expansion valve to cause the first physical quantity to follow a target value, wherein the controller controls the opening degree ratio between the downstream expansion valve and the upstream expansion valve so as to hold the second physical quantity within the predetermined range, and wherein the controller controls the opening degree of the upstream expansion valve to a value obtained by multiplying the opening degree of the downstream expansion valve by the opening degree ratio.

9. The refrigeration cycle method according to claim 7, wherein the physical quantity is a second physical quantity, and the method further comprises:

measuring a first physical quantity that correlates with a temperature of the refrigerant discharged from the compressor; and controlling the opening degree of the downstream expansion valve to cause the first physical quantity to follow a target value, and controlling the opening degree ratio between the downstream expansion valve and the upstream expansion valve so as to hold the physical quantity within the predetermined range, wherein in controlling the opening degree of the upstream expansion valve and the opening degree of the downstream expansion valve, the opening degree of the upstream expansion valve is controlled to a value obtained by multiplying the opening degree of the downstream expansion valve by the opening degree ratio.

* * * * *